Dec. 31, 1946.                R. W. LUCE                2,413,510
                               FASTENER
                          Filed March 25, 1942
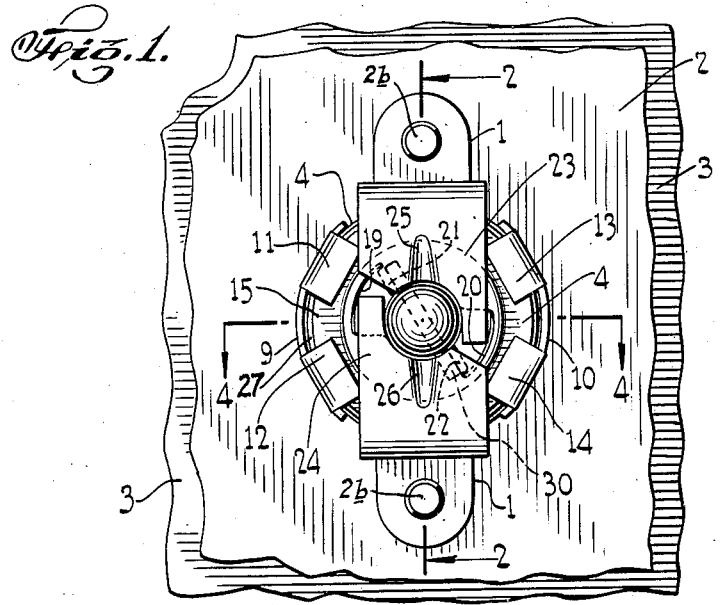
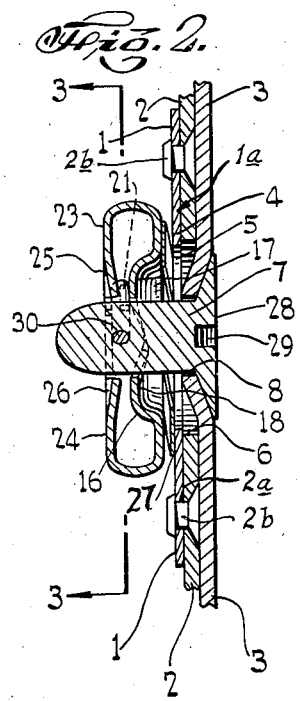
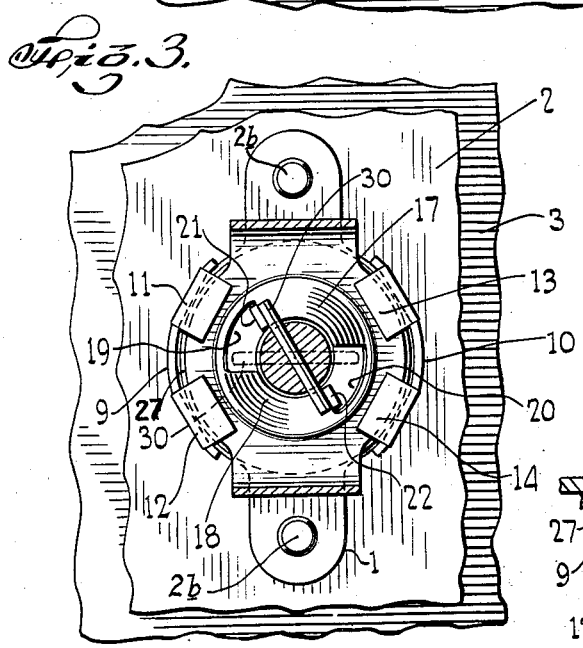
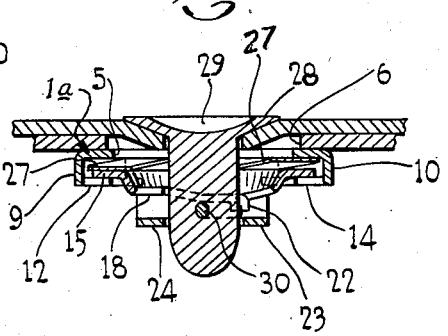
INVENTOR.
RICHARD W. LUCE
BY
George F. Gill
ATTORNEY Patented Dec. 31, 1946

2,413,510

UNITED STATES PATENT OFFICE 2,413,510

FASTENER

Richard W. Luce, Southport, Conn.

Application March 25, 1942, Serial No. 436,117

23 Claims. (Cl. 24—221)

The invention herein disclosed relates to a fastener of the kind that is commonly termed a cowl fastener.

Fasteners of the kind mentioned are generally designed and constructed such that the engaging parts thereof may be readily and easily released and reengaged. Such fasteners are utilized to secure cowls or covers which when removed access may be had to mechanism covered thereby. For this purpose, such fasteners are used extensively in airplane construction and frequently consists of two interengaging parts, one of which is rigidly secured to one of the elements or members to be secured together and the other of which is provided with a head for engaging the other member.

In a fastener of this kind, it is desirable that a cushion be provided against repeated shock loading to which a rigid fastener is repeatedly subjected in use. And in addition the parts must be locked in fastening position to prevent relative movement and consequent loosening and separation under the forces resulting from vibration and shock. As such fasteners have been constructed, heretofore and prior to the invention herein disclosed, they include a single resilient element that is arranged such that it effects the locking of the elements in fastening position and also carry the load. In some instances, the resilient element forms one of the interengaging elements of the fastener and it is directly and rigidly secured to one of the members to be fastened together. In other instances, the resilient element is arranged to act between the two elements of the fastener, one of which is rigidly secured to one of the members to be secured together. The resilient element in this latter construction serves to maintain the two elements of the fastener in locked interengaging relation and also carries the load.

An object of this invention is to provide a cowl fastener that includes a resilient cushion arranged to accommodate variations in thickness of members to be fastened together and to prevent shock loading of the fastener in service. Another object of the invention is to provide a fastener of this kind in which the locking of the elements in fastening position is independent of the cushion for absorbing the shock loading. A further object of the invention is to provide a fastener of this kind that is so constructed as to have the property known as "float," that is such that the secured element is shiftable to take care of slight misalinement in the fastener openings in the members to be fastened together.

These objects and certain advantages that will hereinafter appear are realized in the embodiments of the invention illustrated in the accompanying drawing and described in detail below. The drawing includes:

Fig. 1 which is a plan of a cowl fastener constructed in accordance with this invention;

Fig. 2 which is a transverse section of the same taken on the line 2—2 of Fig. 1;

Fig. 3 which is a plan of the same partly in section;

Fig. 4 which is a section taken on the line 4—4 of Fig. 1; and

Fig. 5 which is an end elevation of resilient washer forming a part of the construction.

The cowl fastener illustrated in Figs. 1 to 4 includes a fastener element and a device for retaining the fastener element. The latter comprises a base 1a having oppositely extending wings 1 with openings therethrough, through which openings 2a rivets 2b extend to secure the base to a plate 2 which constitutes one of the members to be secured together. The plate 2 generally constitutes a rigid part of the structure and to this plate a cowl or other cover represented by a plate 3 is secured by several fasteners of the kind herein disclosed. The base has a central substantially circular section 4 from which the wings 1 extend. Centrally of the section 4, the base is provided with an opening 5 which, when the base is secured to the plate 2, is axially alined with an opening 6 in the plate 2. These openings are provided to receive the fastener 7 which extends through an opening 8 in the plate 3 and the openings 5 and 6. It is to be noted that the openings 5 and 6 are substantially larger than the opening through the plate 3 which may be countersunk as indicated.

On opposite parts of the circular section 4, there are provided arcuate edge flanges 9 and 10 extending perpendicularly from the base. Each of these flanges extend along an arc of approximately ninety degrees. From the flange 9, two tongues or tabs 11 and 12 extend. Like tabs or extensions 13 and 14 extend from the flange 10. These tabs when bent inwardly, parallel to the base, serve to hold a fastener retaining member secured to the base.

The retainer member is constructed from a single piece of metal and includes a substantially circular section 15 that is received between the flanges 9 and 10 and over which the tabs extend. The diameter of the circular section 15 is less than the inside diameter of the flanges 9 and 10 so that the section 15 has limited movement with respect to the base in all lateral directions. Centrally of the circular section 15, there is formed on the section 15 a boss 16, pierced centrally thereof to provide an opening for the fastener and arranged to provide two oppositely inclined, inwardly extending surfaces 17 and 18 which in effect form partial convolutions of a helix in oppositely directed planes inclined to the surface of the base. Intermediate the ends of these surfaces, which constitute rigid cam surfaces, the base of the boss 16 is slotted as at 19 and 20. The end edge of each inclined surface, the end edge distant from the plane of the circular section 15, is provided with an extension, extensions 21 and 22, which extends substantially perpendicular to the surface and constitutes a stop.

At diametrically opposite points, the section 15 is provided with extensions 23 and 24 which extend between the flanges 9 and 10 and are reversely bent to form resilient spring sections axially spaced from but in cooperating relation with respect to the inclined surfaces 17 and 18. The end edges of the resilient elements 23 and 24 are shaped as indicated in Fig. 1 to provide an opening for the end of the fastener element 7. Intermediate the side edges of the element 23 a detent 25 is formed therein which extends in the direction of the inclined surface 17 and to the end edge of the element 23. A similar detent 26 is formed in the resilient element 24.

Interposed between the retainer member, the section 15 thereof, and the base, the circular section 4 thereof, there is a resilient washer 27. Preferably, this washer 27 is, as illustrated in Fig. 5, sinusoidal in form to permit the retainer member to move, a limited amount, towards the base, and to provide a resilient force normally separating and tending, under load, to separate these members axially of the openings therethrough.

The device above described is adapted to be used with the fastener 7 to secure two members together. The fastener 7 primarily consists of a rod headed at one end to provide a head 28. The head 28 is slotted diametrically, preferably with a concave slot 29 which will receive the edge of a coin. Adjacent the opposite or unheaded end of the rod, a pin 30 extends through the rod diametrically thereof. Preferably, the rod is first inserted through the opening 8 in the plate 3 and then the pin is driven through an opening provided therefor in the rod. The fastener element is thus retained by the plate 3 when the plate is removed.

In securing the two plates together, the fastener 7 is entered through the plate 2, the base, the washer 27 and the retainer member. To extend through the floating member, the pin must be alined with the slots 19 and 20. In this position, with the plates in contact, the rod extends through such that the pin is in position, shown in broken lines in Fig. 3, and in a plane to engage, upon rotation, the inclined surfaces 17 and 18. The fastener 7 is then rotated counterclockwise, as seen in Fig. 2, and the pin 30 rides up the inclined surfaces, drawing up the fastener, and drawing the plates 2 and 3 together. The detents 25 and 26 of the spring elements 23 and 24 are spaced, axially from the inclined surfaces, a distance less than the diameter of the pin 30. As the pin is moved around, and engages the detents, the spring elements are forced axially and snap in position behind the pin. The fastener is turned until the pin engages the stops 21 and 22 and when in this position, the plates 2 and 3 are firmly secured together. In this position, the pin is between the stops and the detents 25 and 26 (see Fig. 1). The spring elements with the detents so engaging the pin secure the fastener 7 against accidental movement under the influence of forces resulting from vibration and shock ordinarily encountered in service. The fastener 7 is however readily turned to release position by the application of manual force as through a coin inserted in the slot in the head.

The spring washer 27 interposed between the base and the retainer member serves two purposes. Frequently, plates of a specified gauge or thickness vary slightly in thickness. The washer 27 accommodates such tolerances in plate thickness. In addition, during service, particularly on airplanes, fasteners of this kind are repeatedly shock loaded. The spring 27 acts as a cushion to absorb the shock and the fastener is not therefore subjected to repeated shock loading.

It will be observed that the locking spring elements 23 and 24 are so related to the fastener that they are not affected by the load. Their only function is to hold the detents 25 and 26 in position to retain the fastener 7 in fastening position on the inclined surfaces 17 and 18. If the spring 27 should fail under repeated shock loading, it has no effect upon the locking action of the spring elements 23 and 24 and there is, therefore, no danger of the fastener loosening and separating.

Generally, a number of such fasteners are utilized to retain a cover plate or cowl in position. In most instances, the several holes in the cover plate 3 do not all accurately aline with the corresponding fastener holes in the rigidly secured plate 2. The float of the retainer, the ability to move a limited extent in all lateral directions, serves to accommodate any such misalinement. In addition, the provision of rigid inclined surfaces provides a rigid securing of the plates together in the manner, for example, of a nut and bolt.

It will be apparent that other resilient members might be used to replace the washer and, for example, resilient tongues might well be cut in the retainer element and extend therefrom towards the base. As the retainer member is preferably made from heat treatable steel and is heat treated such tongues would provide the desirable resiliency. It will also be obvious that various other changes may be made by those skilled in the art in the details of the embodiments of the invention disclosed in the drawing and described above within the principle and scope of the invention as expressed in the appended claims.

I claim:

1. A device of the kind described comprising in combination a base adapted to be secured to one of two members to be fastened together, the base having an opening therethrough, a surface adjacent said opening, shiftable with respect thereto and inclined to the plane of the base, and a resilient element adjacent the inclined surface and spaced therefrom axially of the opening through the base, the resilient element being positioned to engage a member moved along the inclined surface.

2. A device of the kind described comprising in combination a base adapted to be secured to one of two members to be fastened together, the base having an opening therethrough, a member secured to the base and having limited movement with respect thereto in all lateral directions, said member including an inclined surface for engaging a fastener entered therein, and means for retaining a fastener engaged by the inclined surface and in fastening position on the inclined surface.

3. A device of the kind described comprising in combination a base adapted to be secured to one of two members to be fastened together, the base having an opening therethrough to receive a fastener, and a member secured to the base and having limited movement with respect thereto in all lateral directions, said member including an inclined fastener engaging surface for engaging a fastener entered therein and resilient members overlapping the inclined surface for engaging an element of a fastener riding on the inclined surface.

4. A device of the kind described comprising a base adapted to be secured to one of two members to be fastened together the base having an opening therethrough to receive a fastener, a member shiftably secured to the base, resilient means spacing the member and the base axially of the opening through the base, the member including a rigid inclined fastener engaging surface for engaging a fastener element entered in the device.

5. A device of the kind described comprising in combination a base adapted to be secured to one of two members to be fastened together, the base having an opening therethrough to receive a cooperating fastener element, a member shiftably secured to the base and including a rigid fastener engaging surface arranged to cooperate with a fastener, and means in cooperating relation with respect to the fastener engaging surface for retaining a fastener engaged by the fastener engaging surface in fastening position.

6. A device of the kind described comprising in combination a base adapted to be secured to one of two members to be fastened together, the base having an opening therethrough to receive a cooperating fastener element, a member shiftably secured to the base and including a rigid fastener engaging surface arranged to cooperate with a fastener, and means in cooperating relation with respect to the fastener engaging surface for retaining a fastener engaged by the fastener engaging surface in fastening position, and resilient means engaging the member and the base.

7. A device of the kind described comprising in combination a base adapted to be secured to one of two members to be fastened together, the base having an opening therethrough, a member secured to the base and having limited movement with respect thereto in all lateral directions, the member including a fastener engaging surface about the opening through the base and resilient members adjacent the fastener engaging surface.

8. A device of the kind described comprising in combination a base adapted to be secured to one of two members to be fastened together, the base having an opening therethrough, a member secured to the base and having limited movement with respect thereto in all lateral directions, the member including a fastener engaging surface about the opening through the base and resilient members adjacent the fastener engaging surface, and resilient means engaging the member and the base.

9. A device of the kind described comprising in combination a base adapted to be secured to one of two members to be fastened together, the base having an opening for a fastener, and a member secured to the base and having limited movement with respect thereto in all lateral directions, the member including a section arranged parallel to the base having an opening therethrough substantially alined with the opening through the base, inclined, helical surfaces adjacent the opening and spring sections arranged in juxtaposition with respect to the inclined surface.

10. A device of the kind described comprising in combination a base adapted to be secured to one of two members to be fastened together, the base having an opening for a fastener, and a member secured to the base and having limited movement with respect thereto in all lateral directions, the member including a section arranged parallel to the base having an opening therethrough substantially alined with the opening through the base, inclined, helical surfaces adjacent the opening and spring sections arranged in juxtaposition with respect to the inclined surface, and resilient means acting between the base and the member.

11. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, said plate being formed with opposed channel-shaped guides loosely encompassing portions of said socket member.

12. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastening attaching said plate to said support being channelled for shiftably receiving a portion of said socket members.

13. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastening attaching said plate to said support being channelled and presenting opposed guides for shiftably receiving a portion of said socket member.

14. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, and presenting opposed guides loosely embracing opposed portions of said socket member permitting lateral shifting of said socket base on said attaching plate.

15. In a rotary operative fastener of the type comprising a rotary stud formed with a radially extending arm and a socket member formed with a base shiftably attached to an apertured support and adapted to interlock with the stud arm upon turning movement of the latter, of an attaching member comprising an apertured plate secured to said support, and presenting opposed guides loosely embracing opposed portions of said socket member permitting lateral shifting of said socket base over the aperture of said attaching plate.

16. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, and presenting opposed guides loosely embracing opposed sides of said socket member.

17. A socket fastener member for attachment to an apertured support comprising a stud-receiving socket having an elongated base formed with a stud-receiving aperture and a raised stud-engaging seat adjacent said aperture, the terminal end portions of said base being disposed in a plane spaced from the plane of said seat and constituting bearing sections, an attaching member for connecting said socket member to said support comprising an elongated plate supporting said socket and having its terminal ends beyond said bearing sections fixedly attached to said support, said plate providing a supporting surface for said bearing portions and being formed with an intermediate aperture overlying said support aperture and transversely disposed loop means on said plate overlying said bearing portions, said socket member being bodily shiftable upon said attaching member.

18. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastenings attaching said plate to said support being channelled and presenting opposed guides for shiftably receiving a portion of said socket member, and means for limiting shifting movement of said socket member in a direction at right angles to said guides.

19. In a rotary operative fastener of the type comprising a rotary stud formed with a radially extending arm and a socket member formed with a base shiftably attached to an apertured support and adapted to interlock with the stud arm upon turning movement of the latter, of an attaching member comprising a plate secured to said support, the sides of said plate intermediate the fastenings attaching said plate to said support being channelled and presenting opposed guides for shiftably receiving a portion of said socket member, said plate being formed with spaced stop means for engaging sides of said base to limit shifting of the socket member in a direction at right angles to said guides.

20. In a rotary operative fastener of the type comprising a rotary stud formed with a radially extending arm and a socket member formed with a base shiftably attached to an apertured support and adapted to interlock with the stud arm upon turning movement of the latter, of an attaching member comprising an apertured plate secured to said support, and presenting opposed guides loosely embracing opposed portions of said socket member permitting lateral shifting of said socket base over the aperture of said attaching plate, said plate being formed with spaced stop means for engaging sides of said base to limit shifting of the socket member in a direction at right angles to said guides.

21. A fastener for use in securing together an apertured support and a part to be attached thereto which is provided with a rotatably mounted stud, said fastener comprising a stud-engaging fastener member for cooperative engagement with the rotatable stud, retainer means adapted to be mounted on the support and supporting said stud-engaging fastener member and means on said retainer overlying a portion of said fastener member whereby lateral shifting of said stud-engaging fastener member in a plurality of directions relative to the aperture of said support may be effected.

22. A fastener for use in securing together an apertured support and a part to be attached thereto which is provided with a rotatably mounted stud, said fastener comprising a stud-engaging fastener member provided with spaced bearing portions and retainer means adapted to be mounted on the support and provided with a bearing surface for slidably engaging said bearing portions of said fastener member, said retainer being formed with means overlying and spaced from said bearing portions.

23. In a fastener for cowling or the like, a supporting structure adapted to be rigidly attached to an apertured support, a fastener element comprising a metal strip having a central aperture and rigid cam means adjacent the aperture adapted to receive and interlock with a cooperating rotary fastener element upon turning movement of the latter, said strip having bearing sections beyond said aperture adapted to bear slidably on the supporting structure in a plane spaced from the said cam means, and means on said supporting structure overlying said bearing sections for loosely attaching said strip to said supporting structure, said strip being bodily shiftable laterally in at least two directions laterally relative to said supporting structure.

RICHARD W. LUCE.